(12) United States Patent
Shibasaki

(10) Patent No.: US 7,991,862 B2
(45) Date of Patent: Aug. 2, 2011

(54) CONTENT PURCHASING AND DISTRIBUTING METHOD

(75) Inventor: Hiroaki Shibasaki, Tokyo (JP)

(73) Assignee: Pioneer Corporation, Tokyo (JP)

( * ) Notice: Subject to any disclaimer, the term of this patent is extended or adjusted under 35 U.S.C. 154(b) by 181 days.

(21) Appl. No.: 12/440,588

(22) PCT Filed: Feb. 8, 2007

(86) PCT No.: PCT/JP2007/052283
§ 371 (c)(1),
(2), (4) Date: Mar. 10, 2009

(87) PCT Pub. No.: WO2008/096442
PCT Pub. Date: Aug. 14, 2008

(65) Prior Publication Data
US 2009/0317066 A1    Dec. 24, 2009

(51) Int. Cl.
*G06F 15/16* (2006.01)
(52) U.S. Cl. .......................... 709/221; 709/203; 709/232
(58) Field of Classification Search .................. 709/221, 709/232, 201, 203, 217
See application file for complete search history.

(56) References Cited

U.S. PATENT DOCUMENTS

| | | | |
|---|---|---|---|
| 7,363,384 B2* | 4/2008 | Chatani et al. | 709/232 |
| 7,533,061 B1* | 5/2009 | Cheng et al. | 705/50 |
| 2008/0147862 A1* | 6/2008 | Chatani et al. | 709/225 |

FOREIGN PATENT DOCUMENTS

| | | |
|---|---|---|
| JP | 2001-265584 | 9/2001 |
| JP | 2002-15151 | 1/2002 |
| JP | 2002-268968 | 9/2002 |
| JP | 2003-125130 | 4/2003 |

OTHER PUBLICATIONS

"Podcast Jiyu de Tegaru, Chukonen ni Ninki", [online], Nov. 28, 2005, Kabushiki Kaisha Kyodo News, [retrieval date Feb. 23, 2007], Internet <http://db.g-search.or.jp/> G-Search, Ippanshi Kiji Database yori Shutoku.

* cited by examiner

*Primary Examiner* — Ramsey Refai
(74) *Attorney, Agent, or Firm* — Young & Thompson

(57) ABSTRACT

The content reproducing apparatus (100) includes an acquiring unit (101), a requesting unit (102), and an accepting unit (103). The acquiring unit (101) acquires information concerning purchase target content. The requesting unit (102) makes a purchase request for the purchase target content acquired by the acquiring unit (101). The accepting unit (103) accepts the purchase target content distributed by the content distributing apparatus based on the purchase request by the requesting unit (102) from the content managing apparatus that manages the content reproducing apparatus (100).

5 Claims, 10 Drawing Sheets

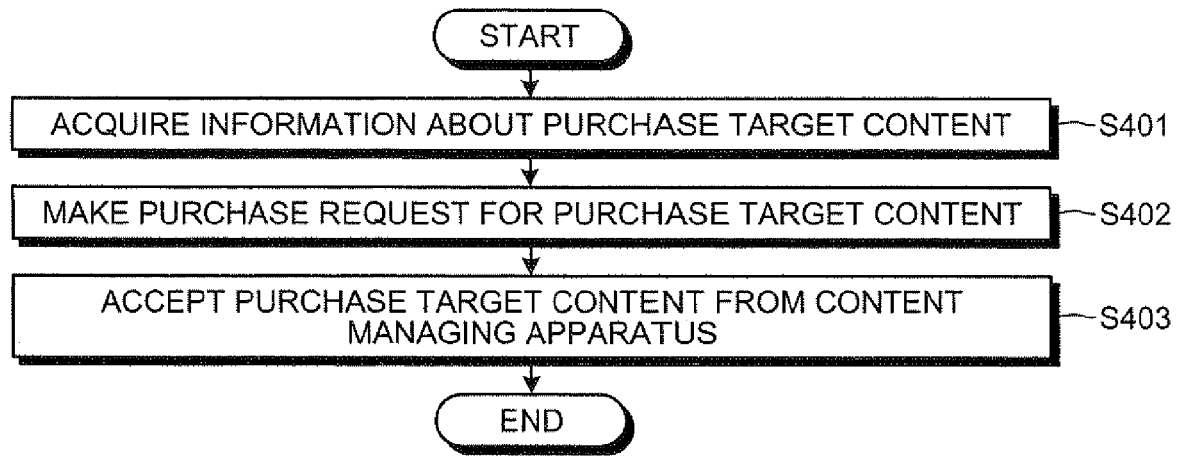
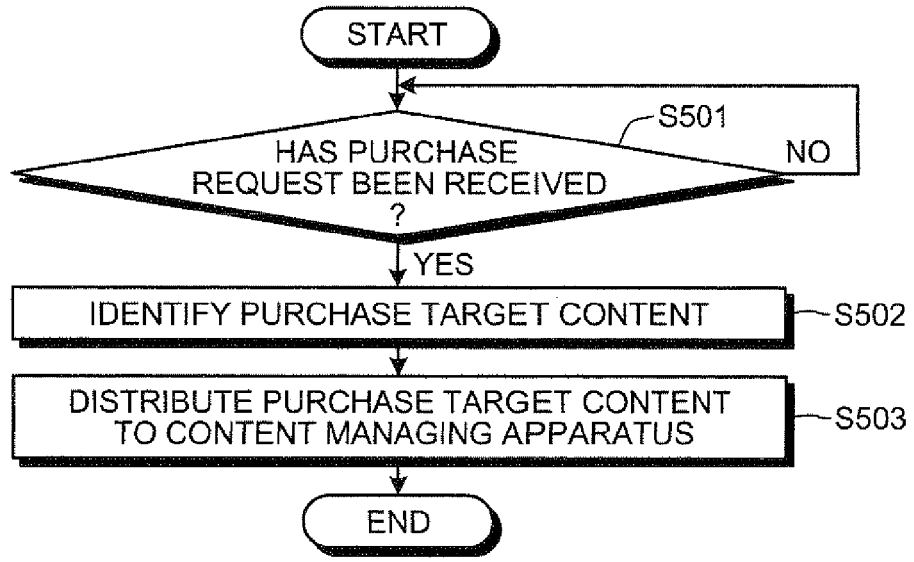

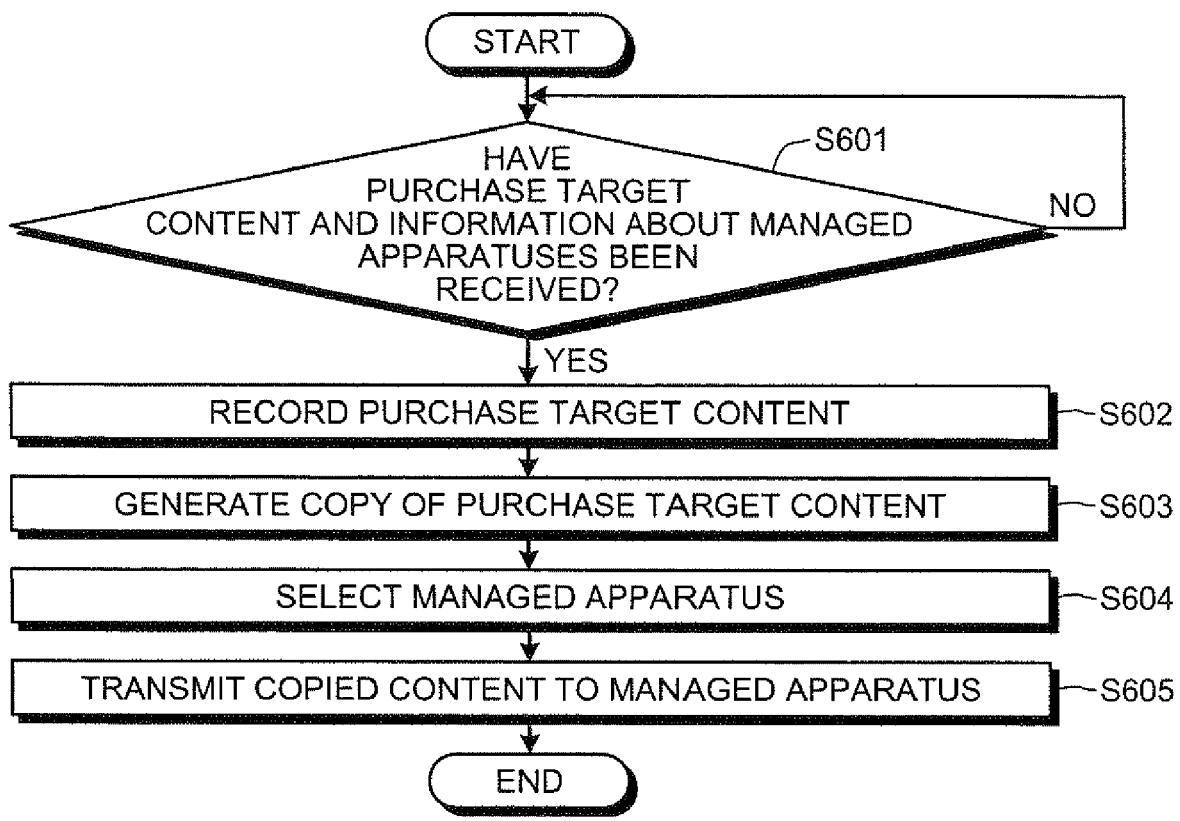

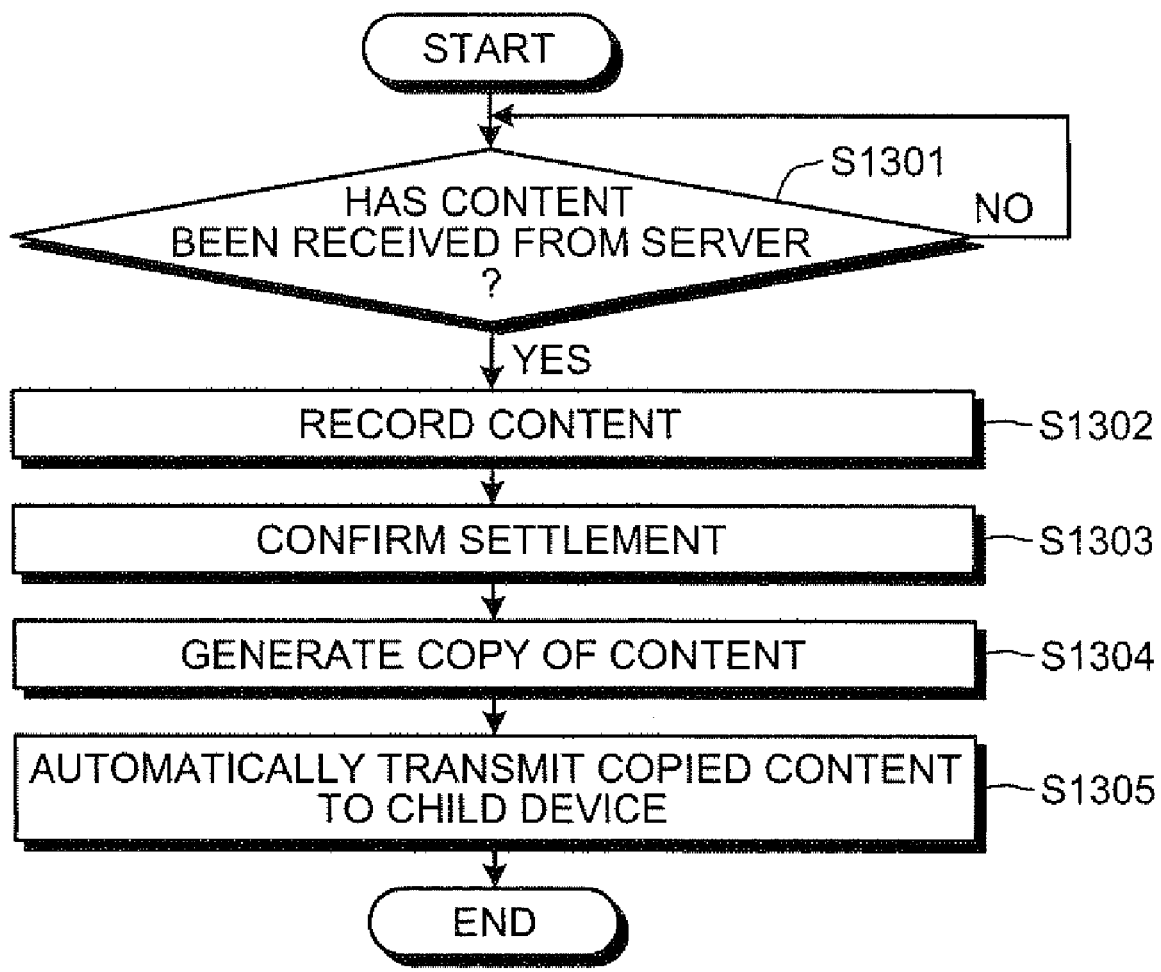

CONTENT PURCHASING AND DISTRIBUTING METHOD

TECHNICAL FIELD

The present invention relates to a content reproducing apparatus, a content distributing apparatus, a content managing apparatus, a content purchase requesting method, a content purchasing method, a content distributing method, a content managing method, a content purchasing and distributing method, a content purchase requesting program, a content purchasing program, a content distributing program, a content managing program, a content purchasing and distributing program, and a recording medium. However, the application of the present invention is not limited to the content reproducing apparatus, the content distributing apparatus, the content managing apparatus, the content purchase requesting method, the content purchasing method, the content distributing method, the content managing method, the content purchasing and distributing method, the content purchase requesting program, the content purchasing program, the content distributing program, the content managing program, the content purchasing and distributing program, and the recording medium.

BACKGROUND ART

Recently, technology such as subscription services in which arbitrary users can use personal terminals to download and/or audibly reproduce tracks among predetermined content during a contract period by paying a given contract fee, is becoming widespread.

Concerning information utilization limited to a given period, proposals have been made to allow a user to execute a given program provided the user maintains a connection contract with a given network provider (see, e.g., Patent Document 1 below).

Specifically, the proposal described in Patent Document 1 is of a configuration in which a license key that expires after a short period is set with respect to software distributed to an information terminal of a user and the license of the software is updated by connecting to a network provider.

Patent Document 1: Japanese Patent Application Laid-Open Publication No. 2001-265584

DISCLOSURE OF INVENTION

Problem to be Solved by the Invention

Since the listening of tracks by a user is limited to a contract period in the technology above, for example, a problem arises in that the user cannot listen to the tracks after the contract period has elapsed. Further, when a user attempts to purchase a track using the technology of Patent Document 1 and wants to purchase the track through a terminal that the user is listening to and is among registered terminals, for example, a problem arises in that the track cannot be downloaded if the communication environment of the terminal is unstable. Since content may be purchased and downloaded from a server using any of the registered terminals, for example, a problem arises in that the user becomes unable to comprehend what has been downloaded, at what time, and with which terminal.

Means for Solving Problem

To solve the problems above and achieve an object, a content distributing system according to an embodiment includes a content distributing apparatus that distributes video or audio content, and further includes content recording apparatuses that are communicable with the content distributing apparatus and record content distributed from the content distributing apparatus. The content recording apparatuses respectively include a request transmitting unit that transmits to the content distributing apparatus, a content purchase request including specification information specifying content and identification information uniquely identifying the content recording apparatuses respectively; a content receiving unit that receives from the content distributing apparatus, the content corresponding to the purchase request transmitted; and a recording unit that records the content received by the content receiving unit. The content distributing apparatus includes a request receiving unit that receives a content purchase request from one of the content recording apparatuses; a determining unit that determines communication environment quality for the content recording apparatuses, respectively; a selecting unit that based on communication environment qualities determined by the determining unit, selects from among the content recording apparatuses, a content recording apparatus as a destination to which the content corresponding to the purchase request is to be transmitted; a confirming unit that confirms remittance for the content by a user of the content recording apparatus selected by the selecting unit; and a content transmitting unit that, in response to confirmation of remittance, transmits the content to the content recording apparatus selected.

A content distribution method according to an embodiment is for a content distributing system that includes a content distributing apparatus that distributes video or audio content, and further includes content recording apparatuses that are communicable with the content distributing apparatus and record content distributed from the content distributing apparatus. The content distribution method includes transmitting to the content distributing apparatus, a content purchase request including specification information specifying content and identification information uniquely identifying the content recording apparatuses respectively; receiving from the content distributing apparatus, the content corresponding to the purchase request transmitted; recording the content received at the receiving the content; receiving a content purchase request from one of the content recording apparatuses; determining communication environment quality for the content recording apparatuses, respectively; selecting based on communication environment qualities determined at the determining and from among the content recording apparatuses, a content recording apparatus as a destination to which the content corresponding to the purchase request is to be transmitted; confirming remittance for the content by a user of the content recording apparatus selected at the selecting; and transmitting, in response to confirmation of remittance, the content to the content recording apparatus selected.

A computer-readable recording medium according to an embodiment stores therein a computer program that with respect to a content distributing system that includes a content distributing apparatus that distributes video or audio content, and further includes content recording apparatuses that are communicable with the content distributing apparatus and record content distributed from the content distributing apparatus, causes a computer to execute: transmitting to the content distributing apparatus, a content purchase request including specification information specifying content and identification information uniquely identifying the content recording apparatuses respectively; receiving from the content distributing apparatus, the content corresponding to the purchase request transmitted; recording the content received at the receiving the content; receiving a content purchase request from one of the content recording apparatuses; determining communication environment quality for the content recording apparatuses, respectively; selecting based on communication environment qualities determined at the determining and from among the content recording apparatuses, a content recording apparatus as a destination to which the content corresponding to the purchase request is to be transmitted; confirming remittance for the content by a user of the content recording apparatus selected at the selecting; and transmitting, in response to confirmation of remittance, the content to the content recording apparatus selected.

BRIEF DESCRIPTION OF DRAWINGS

FIG. 4 is a flowchart of a content purchase process of the content reproducing apparatus;

FIG. 5 is a flowchart of a content distribution process of the content distributing apparatus;

FIG. 6 is a flowchart of a content management process of the content managing apparatus;

FIG. 13 is a flowchart of an exemplary management process of the PC according to the example.

Figure 1:
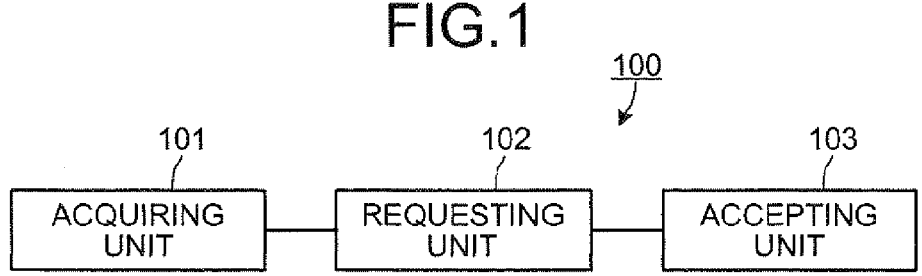
FIG. 1 is a block diagram of an exemplary functional configuration of a content reproducing apparatus according to an embodiment.

EXPLANATIONS OF LETTERS OR NUMERALS 100 content reproducing apparatus
101 acquiring unit
102 requesting unit
103 accepting unit
200 content distributing apparatus
201 receiving unit
202 identifying unit
203 distributing unit
300 content managing apparatus
301 receiving unit
302 recording unit
303 copying unit
304 selecting unit
305 transmitting unit

BEST MODE(S) FOR CARRYING OUT THE INVENTION

A preferred embodiment will now be described for a content reproducing apparatus, a content distributing apparatus, a content managing apparatus, a content purchase requesting method, a content purchasing method, a content distributing method, a content managing method, a content purchasing and distributing method, a content purchase requesting program, a content purchasing program, a content distributing program, a content managing program, a content purchasing and distributing program, and a recording medium according to the present invention with reference to the accompanying drawings.

Embodiment (Functional Configuration of Content Reproducing Apparatus)

A functional configuration of a content reproducing apparatus 100 according to the embodiment of the present invention will first be described. FIG. 1 is a block diagram of an exemplary functional configuration of the content reproducing apparatus according to the embodiment. As depicted in FIG. 1, the content reproducing apparatus 100 includes an acquiring unit 101, a requesting unit 102, and an accepting unit 103. Although not depicted, the content reproducing apparatus 100 further includes constituent elements for reproduction and output, such as a reading unit that reads content.

The content reproducing apparatus 100 is an apparatus that reproduces content distributed from a content distributing apparatus 200 that is not depicted and distributes video or audio content. The content reproducing apparatus 100 may be disposed on, for example, a mobile object and enable reproduction of the video or audio content with the use of a subscription service. The subscription service is, for example, a service that enables users to download content of a predetermined content group via reproduction terminals, etc., of the users through payment of a given contract fee.

The acquiring unit 101 acquires information concerning content to be purchased (hereinafter, "purchase target content"). The information concerning purchase target content includes specification information that specifies purchase target content desired by a user. The specification information may be meta data such as content titles, names of authors, track IDs (IDentifiers) such as copyright numbers and identification numbers in the subscription service, for example. Further, the specification information may be information including an attribute amount of content or a portion of the content. When an attribute amount of content or a portion of the content is included, content may be identified easily when different versions, such as recording environment, of the same content exist.

The requesting unit 102 makes a purchase request for the purchase target content acquired by the acquiring unit 101. Specifically, for example, the specification information specifying the purchase target content is sent to a request destination apparatus through operation input by a user. The request destination of the purchase request may be the content distributing apparatus or a content managing apparatus 300 that manages a child device described hereinafter.

The accepting unit 103 accepts, based on the purchase request by the requesting unit 102, the purchase target content distributed by the content distributing apparatus 200 from the content managing apparatus 300 that manages the content reproducing apparatus. The accepting method of the accepting unit 103 may be performed regardless of a wired connection or a wireless connection. Content distributed by a recording medium may be accepted. The content managing apparatus 300 is, for example, among plural registered content reproducing apparatuses 100, an apparatus desired by the user to manage the content reproducing apparatuses 100 and distribute the purchase target content to the content reproducing apparatuses 100.

(Functional Configuration of Content Distributing Apparatus)

Figure 2:
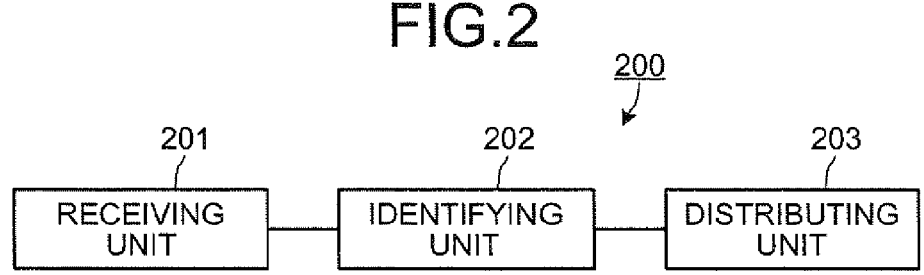
FIG. 2 is a block diagram of an exemplary functional configuration of a content distributing apparatus according to the embodiment.

A functional configuration of the content distributing apparatus 200 according to the embodiment of the present invention will be described. FIG. 2 is a block diagram of an exemplary functional configuration of the content distributing apparatus according to the embodiment. As depicted in FIG. 2, the content distributing apparatus 200 includes a receiving unit 201, an identifying unit 202, and a distributing unit 203.

The content distributing apparatus 200 is a server group that distributes video or audio content to implement the subscription service. The receiving unit 201 receives a purchase request for the purchase target content from an apparatus communicable with the content distributing apparatus 200. The receiving unit 201 may receive the purchase target content directly from the apparatus communicable with the content distributing apparatus 200 or through another apparatus (e.g., the content managing apparatus 300). The apparatus communicable with the content distributing apparatus 200 may make a purchase request for the purchase target content to the content distributing apparatus 200.

The identifying unit 202 identifies the purchase target content based on information concerning the purchase request received by the receiving unit 201. The distributing unit 203 distributes the purchase target content identified by the identifying unit 202 to the content managing apparatus 300 that manages the communicable apparatus. The content managing apparatus 300 is, for example, among plural communicable apparatuses, an apparatus desired by a user to manage the communicable apparatuses and distribute the purchase target content to the communicable apparatuses. A given contract concerning content purchase from the content distributing apparatus 200 is made in advance for the content managing apparatus 300.

(Functional Configuration of Content Managing Apparatus)

Figure 3:
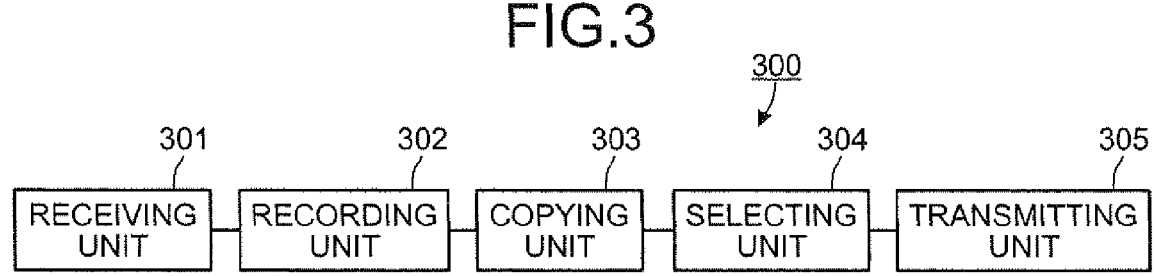
FIG. 3 is a block diagram of an exemplary functional configuration of a content managing apparatus according to the embodiment.

A functional configuration of the content managing apparatus 300 according to the embodiment of the present invention will be described. FIG. 3 is a block diagram of an exemplary functional configuration of the content managing apparatus according to the embodiment. As depicted in FIG. 3, the content managing apparatus 300 includes a receiving unit 301, a recording unit 302, a copying unit 303, a selecting unit 304, and a transmitting unit 305.

The content managing apparatus 300 is located at, for example, a residence and acquires content from the content distributing apparatus 200 that distributes video or audio content. The content managing apparatus 300 may be capable of storing, managing, reproducing, and copying the content acquired. A given contract concerning content purchase from the content distributing apparatus 200 is made in advance for the content managing apparatus 300.

The receiving unit 301 receives the purchase target content distributed by the content distributing apparatus 200 based on the purchase request for the purchase target content from an apparatus managed by the content managing apparatus 300. Information concerning the managed apparatus is added to the purchase target content and received with the purchase target content. Specifically, the managed apparatus may be, for example, an apparatus enabling viewing or listening of the content, making a purchase request for the purchase target content, and capable of recording and reproducing the content. The information concerning the managed apparatus specifically is, for example, information enabling the identification of the managed apparatus and includes authentication information, etc.

The recording unit 302 records onto a recording medium, the purchase target content received by the receiving unit 301. The recording medium is a medium capable of recording the purchase target content, such as a magnetic disk and an optical disc. The copying unit 303 generates a copy of the purchase target content based on the purchase target content recorded by the recording unit 302.

The selecting unit 304 selects a managed apparatus based on the information concerning the managed apparatus received by the receiving unit 301. The transmitting unit 305 transmits the copy of the purchase target content generated by the copying unit 303 to the managed apparatus selected by the selecting unit 304. The transmitting method may be performed regardless of a wired connection or a wireless connection. The content may be distributed via a recording medium.

The content managing apparatus 300 may make a purchase request for video or audio content to the content distributing apparatus 200 that distributes the content. In this case, the content managing apparatus 300 is configured to include an acquiring unit not depicted. The acquiring unit acquires a purchase instruction for the purchase target content from a managed apparatus managed by the content managing apparatus 300 together with specification information specifying the purchase target content. In this case, the transmitting unit 305 transmits the specification information acquired by the acquiring unit together with a purchase request for the content to the content distributing apparatus 200, thereby enabling the receiving unit 301 to receive the purchase target content distributed from the content distributing apparatus 200.

The content reproducing apparatus 100 and the content managing apparatus 300 may be used and applied to a content purchasing system made up of devices communicably linked to each other over a network. In this case, among the devices, setting and registration are performed for a parent device that makes a purchase request for content and a child device that gives a purchase instruction for the content to the parent device. For example, the parent device is the content managing apparatus 300 and the child device is the content reproducing apparatus 100. The child device acquires specification information specifying content to be purchased and transmits a purchase instruction for the content to the parent device together with the acquired specification information. The parent device makes a purchase request for the purchase target content based on the purchase instruction and the specification information transmitted from the child device. In this case, the content distributing apparatus 200 may simply distribute the content to an apparatus sending the purchase request for the content without identifying the parent device or the child device as the destination of the content distribution.

The content reproducing apparatus 100, the content distributing apparatus 200, and the content managing apparatus 300 may be used and applied to a content purchasing system made up of devices distinguished by an acquiring device, not depicted, that acquires content and a requesting device, not depicted, that makes a purchase request for the purchase target content. Specifically, for example, the acquiring device is the content managing apparatus 300 and the requesting device is the content reproducing apparatus 100. In this case, the content distributing apparatus 200 registers identification information indicative of the acquiring device. The content distributing apparatus 200 accepts the purchase request for the purchase target content from the requesting device, identifies the acquiring device and the purchase target content from the accepted purchase request, and distributes the identified purchase target content to the acquiring device.

(Content Purchase Process of Content Reproducing Apparatus)

A content purchase process of the content reproducing apparatus 100 will be described with reference to FIG. 4. FIG. 4 is a flowchart of a content purchase process of the content reproducing apparatus. As depicted in the flowchart of FIG. 4, the acquiring unit 101 acquires information concerning purchase target content (step S401).

The requesting unit 102 makes a purchase request for the purchase target content (step S402). The accepting unit 103 accepts the purchase target content from the content managing apparatus (step S403), ending the process.

As described, according to the content reproducing apparatus 100 of the embodiment, the acquiring unit 101 acquires information concerning the purchase target content and the requesting unit 102 makes a purchase request for the purchase target content to receive the purchase target content from the content managing apparatus 300 that manages the content reproducing apparatus 100. Therefore, a purchase request may be made even if a communication path is narrow between the content reproducing apparatus 100 and the apparatus to which the request is made. Thus, a user can make a content purchase request any time the user wants to purchase the content regardless of the communication environment.

According to the content reproducing apparatus 100 of the embodiment, selection of whether the purchase target content is purchased under the management of the content managing apparatus 300 or through an apparatus other than the content managing apparatus 300 is possible. Therefore, for example, if the purchase target content cannot be purchased under the management of the content managing apparatus 300 for some reason, the purchase target content can be purchased using another selected apparatus as a purchasing device. Thus, a user can make a content purchase request any time the user wants to purchase the content.

According to the content reproducing apparatus 100 of the embodiment, the purchase target content may be purchased by the content reproducing apparatus 100 selected as a purchasing device. Thus, a user can download the purchase target content using the content reproducing apparatus 100 if the purchase cannot be made under the management of the content managing apparatus 300 for some reason or if the communication environment of the content reproducing apparatus 100 is stable.

(Content Distribution Process of Content Distributing Apparatus)

A content distribution process of the content distributing apparatus 200 will be described with reference to FIG. 5. FIG. 5 is a flowchart of a content distribution process of the content distributing apparatus. As depicted in the flowchart of FIG. 5, the receiving unit 201 waits for reception of a purchase request for the purchase target content from an apparatus communicable with the content distributing apparatus 200 (step S501: NO) and, if a purchase request for the purchase target content has been received (step S501: YES), the purchase target content is identified based on the information concerning the purchase request (step S502). The purchase target content is distributed to the content managing apparatus (step S503), ending the process.

As described, the content distributing apparatus 200 of the embodiment receives the purchase request for the purchase target content from an apparatus communicable with the content distributing apparatus 200 and distributes the purchase target content to the content managing apparatus 300. Consequently, all the purchase target content can be distributed to the content managing apparatus 300 based on the purchase requests from the communicable apparatus; hence, the purchase target content can be distributed based only on a content purchase contract for the content managing apparatus 300.

According to the content distributing apparatus 200 of the embodiment, the order in which apparatuses among the apparatuses communicable with the content distributing apparatus 200 are applicable as the content managing apparatus 300 may be set in advance and the communication environments of the apparatuses may be determined to select the content managing apparatus 300 based on the order and the determined communication environments. Therefore, since the content managing apparatus 300, which has the best communication environment, may properly be selected, the content distributing apparatus 200 may stably distribute the purchase target content to the selected content managing apparatus 300.

(Content Management Process of Content Managing Apparatus)

A content management process of the content managing apparatus 300 will be described with reference to FIG. 6. FIG. 6 is a flowchart of a content management process of the content managing apparatus. As depicted in the flowchart of FIG. 6, the receiving unit 301 waits for reception of the purchase target content and information concerning a managed apparatus (step S601: NO). If the purchase target content and information concerning the managed apparatus are received (step S601: YES), the recording unit 302 records the purchase target content (step S602).

The copying unit 303 generates a copy(ies) of the purchase target content recorded by the recording unit (step S603). The managed apparatus is selected based on the information concerning the managed apparatus received by the receiving unit 301 (step S604). The copied content is transmitted to the selected managed apparatus (step S605), ending the process.

As described above, the content managing apparatus 300 of the embodiment may copy and transmit the purchase target content distributed from the content distributing apparatus 200 to managed apparatuses managed by the content managing apparatus 300. Therefore, the content managing apparatus 300 may unify the management of the purchase target content requested for purchase from the managed apparatuses, thereby enabling a user to easily comprehend what is downloaded and at what time with respect to the managed apparatuses by simply accessing the content managing apparatus 300.

The content managing apparatus 300 of the embodiment records the purchase target content distributed from the content distributing apparatus 200 into the recording unit 302. Therefore, copies of the purchase target content may easily be transmitted to a managed apparatus, for example, without connecting to a network, at the time of the transmission to the managed apparatus.

As described, according to the embodiment, the content reproducing apparatus 100 directly makes a purchase request to the content distributing apparatus 200 or makes a purchase request through another apparatus (e.g., the content managing apparatus 300) to the content distributing apparatus 200. The copied content is transmitted from the content distributing apparatus 200 through the content managing apparatus 300 to the content reproducing apparatus 100.

Thus, a user can make a content purchase request with the content reproducing apparatus 100 any time the user wants to purchase the content. Since the content distributing apparatus 200 can distribute all purchase target content to the content managing apparatus 300 based on purchase requests from the content reproducing apparatuses 100, the content can be distributed based only on a content purchase contract for the content managing apparatus 300.

Since the content managing apparatus 300 records and copies the purchase target content and transmits the copied content to the content reproducing apparatuses 100, the management of the content may be unified. Since the content is recorded in the recording unit 302, the copied content may easily be transmitted to the content reproducing apparatuses 100 without connecting to a network.

EXAMPLE

An example of the present invention will be described. In the example, the content distributing apparatus of the present invention is implemented by a subscription service server that provides a subscription service, the content managing apparatus of the present invention is implemented by a PC enabling constant connection, and the content reproducing apparatus of the present invention is implemented by a navigation apparatus mounted on mobile objects such as vehicles (including four-wheel vehicles and two-wheel vehicles) or a reproducing terminal carried by a user and capable of transmission/reception, for example.

(System Overview)

Figure 7:
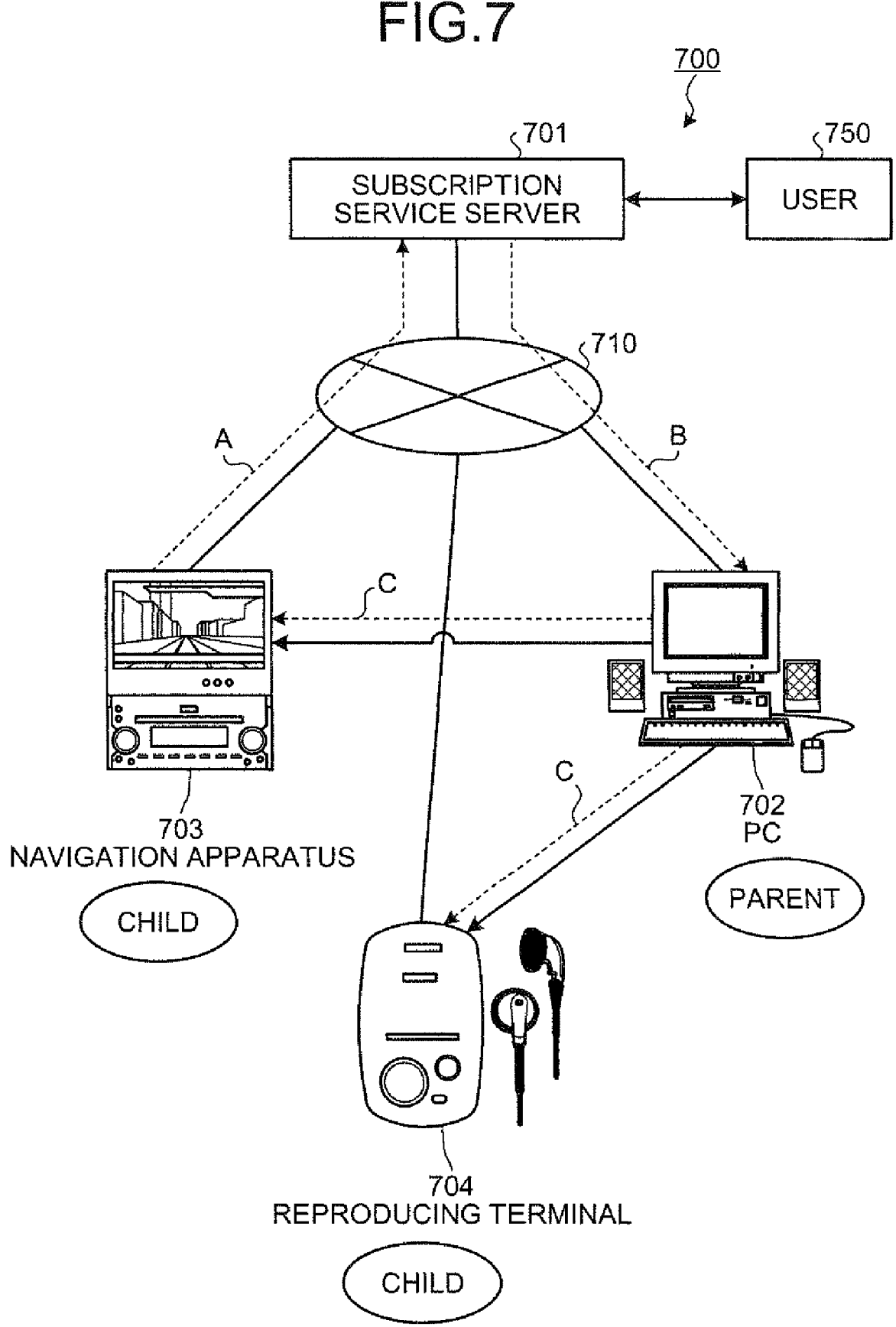
FIG. 7 is a diagram of a subscription service system according to an example.

An overview of a subscription service system according to the example will be described with reference to FIG. 7. FIG. 7 is a diagram of the subscription service system according to the example.

As depicted in FIG. 7, a content updating system 700 includes a subscription service server 701, a PC 702, a navigation apparatus 703, and a reproducing terminal 704. The subscription service server 701, the PC 702, the navigation apparatus 703, and the reproducing terminal 704 are connected through the internet 710. It is assumed that the PC 702, the navigation apparatus 703, and the reproducing terminal 704 respectively belong to a user 750.

Although it is assumed that the PC 702, the navigation apparatus 703, and the reproducing terminal 704 respectively belong to the user 750 in the description of FIG. 7, possession of each may differ and, in such a case, possession may be by friends, family members, etc. such that the user 750 can keep track thereof. The PC 702, the navigation apparatus 703, and the reproducing terminal 704 may be connected through a wired connection or a wireless connection.

The subscription service server 701 is a computer apparatus that distributes content to subscription-service contracted terminals based on contracts for the subscription service. The subscription service server 701 performs a download-type subscription service allowing subscription-service contracted terminals to download content according to the contracts.

Information giving permission for copying or information limiting the number of copies may be added to the distributed content, such as music tracks. For example, if a subscription-service contracted terminal preliminarily has time-limited content, a purchase right may be issued to make the time limit of the time-limited content indefinite. In the following description, content to be purchased includes such purchase rights unless otherwise stated.

The subscription service server 701 may be made up of a server group including a content server that stores and manages content data, an authentication server that authenticates the terminal of the user 750 and that sets and manages a valid period of content, and a charging server that manages contract information and charge information concerning the user 750. Alternatively, the server group may include servers having one or more functions of the content server, the authentication server, and the charging server, implementing all the functions.

In the example, the subscription service server 701 preliminarily has a parent device registered as an apparatus that is a content distribution destination. A child device is registered as an apparatus making a content purchase request to the subscription service server 701 and receiving the distributed content through the parent device from the subscription service server 701. Additionally, the content purchase request may be made from a terminal that is a parent device.

For example, the parent device receives content, records the received content, and transmits a copy of the recorded content to the child device. The parent device manages the content purchase requests from the child device and the content transmitted to the child device. The user 750 may register any one of the PC 702, the navigation apparatus 703, etc., as the parent device. In this example, the PC 702 is registered as the parent device.

An apparatus other than that registered as the parent device is registered as the child device and may be capable of receiving copies of the content received by the parent device; the navigation apparatus 703 and the reproducing terminal 704 are registered as the child devices in this example. The number of registered child devices may be one or more and for example, may be limited to the number of copies of content allowed by the contract.

When a parent device is registered, registration information is directly transmitted to the subscription service server 701 from the apparatus (the PC 702) that the user 750 wants to register as the parent device, and the subscription service server 701 registers the PC 702 as the parent device. Alternatively, the registration may be performed by transmitting to the subscription service server 701, registration information defining the PC 702 as the parent device from the navigation apparatus 703 or the reproducing terminal 704 serving as the child device to confirm whether content distribution to the PC 702 is possible with the receiving subscription service server 701 and to transmit information indicative of parent device registration.

When the parent device is registered, the subscription service server 701 may set the order in which apparatuses among contracted apparatuses are applicable as the parent device. In this case, the subscription service server 701 has a function of checking the qualities of the communication environments for the contracted apparatuses. Specifically, for example, the order in which apparatuses are applicable as the parent device is registered as the order of the PC 702, the navigation apparatus 703, and the reproducing terminal 704, which is in descending order of the possibility of establishing a stable communication environment. The registration of the parent device is performed on the premise that the contract with the subscription service server 701 is made in advance for the apparatus to be defined as the parent device Upon receiving the content purchase request, the subscription service server 701 registers the parent device based on the preset order (the order of the PC 702, the navigation apparatus 703, and the reproducing terminal 704) and the quality of the communication environments for the apparatuses. The quality of the communication environment is determined to be favorable if an apparatus is activated over a network, for example. In the case of a wireless connection, the quality is determined to be favorable if the transmission/reception states are stable, for example.

The navigation apparatus 703 is mounted on a mobile object such as a vehicle providing guidance along a route of the vehicle and reproduces content recorded on a recording medium and content acquired through a communication means. The reproducing terminal 704 is, for example, a portable terminal such as a portable telephone and reproduces content recorded on a recording medium and content acquired through a communication means.

In the example, if a user wants to purchase a track while listening to content such as music using the child device, e.g., the navigation apparatus 703, a purchase request may be made to the subscription service server 701. Specifically, for example, the child device acquires specification information that specifies content the user wants to purchase through the manipulation of input buttons by the user 750 and makes a purchase request to the subscription service server 701.

In other cases, content to be purchased may be determined by reference to a list of acquired specification information and the purchase request may be made based on this determination. The specification information may be acquired from the subscription service server 701 or may be acquired from another Web site or database. The specification information may be information acquired by clipping out a portion of content with the child device, or the specification information may be information acquired from characteristics (e.g., harmonic progression and tempo) by analyzing the content.

The specification information may be generated not only by the download-type subscription system but also by a medium such as a radio. The specification information may be acquired automatically according to purchase instructions and, specifically, for example, while content such as a music track desired to be purchased is being reproduced, the specification information acquiring operation may be omitted if the subscription service server 701 can recognize the track. Instead of reception of the specification information, necessary information may be picked up from the specification information and included in the purchase request in conformity with the purchase format specified by the subscription service server 701.

In the example, the navigation apparatus 703 serving as the child device has a function of directly purchasing content. Therefore, the reception of input may be such that, when purchasing content, the user 750 may select the PC 702 serving as the parent device to be used as a purchasing device to make a purchase or the navigation apparatus 703 to be used as a purchasing device to make a purchase. More specifically, configuration may be such that the user 750 can select between receiving copies from the parent device based on the management of the parent device and directly receiving content from the subscription service server 701 with the navigation apparatus 703. Concerning selection of the purchasing device, in addition to the PC 702 and the navigation apparatus 703, configuration may be such that the reproducing terminal 704 can be selected as the purchasing device.

If the purchasing device is not selected by the user 750, the parent device may be set as the purchasing device by default or if the contract of the specified purchasing device is canceled, the parent device may automatically be set as the purchasing device. If a content purchase request is made by a child device not having such a function of selecting the purchasing device, the parent device may be defined as the purchasing device by default.

An overview of a content purchase request in the example will be described. A content purchase request is made from the navigation apparatus 703 or the reproducing terminal 704 to the subscription service server 701 based on input from the user 750 (a line A of FIG. 7). Upon receiving the purchase request, the subscription service server 701 uses the function of the authentication server to verify whether the user 750 has a valid contract. The function of the charging server is also used for setting content to be distributed among content stored and managed by the function of the content server according to the managed contract information concerning the user 750. Specifically, for example, the content to be distributed is content distributed to the PC 702 (the parent device) according to the contract information and the charging information concerning the content requested from the child device (a line B of FIG. 7).

The PC 702 records the received content and, generates and transmits a copy of the content to the navigation apparatus 703 or the reproducing terminal 704 that made the purchase request (a line C of FIG. 7). Although the subscription service server 701, the PC 702, the navigation apparatus 703, and the reproducing terminal 704 are connected through the internet 710, the communication environment of the navigation apparatus 703 and the reproducing terminal 704 may become unstable at some locations. Meanwhile, the PC 702 is assumed to be constantly connected and has a stable communication environment. Therefore, the child device can make only a purchase request transmittable even through a narrow communication path and the child device can receive a copy after the subscription service server 701 downloads content to the parent device with a stable communication environment.

Since the parent device records the received content, for example, even if the transmission is interrupted due to a poor communication environment of the connection to the child device, a copy may easily be transmitted by reconnecting the child device. The content may be transmitted to the child device by connecting to a network or by using, for example, a recording medium such as a memory card without connecting to a network.

(Hardware Configuration of the Subscription Service Server 701)

Figure 8:
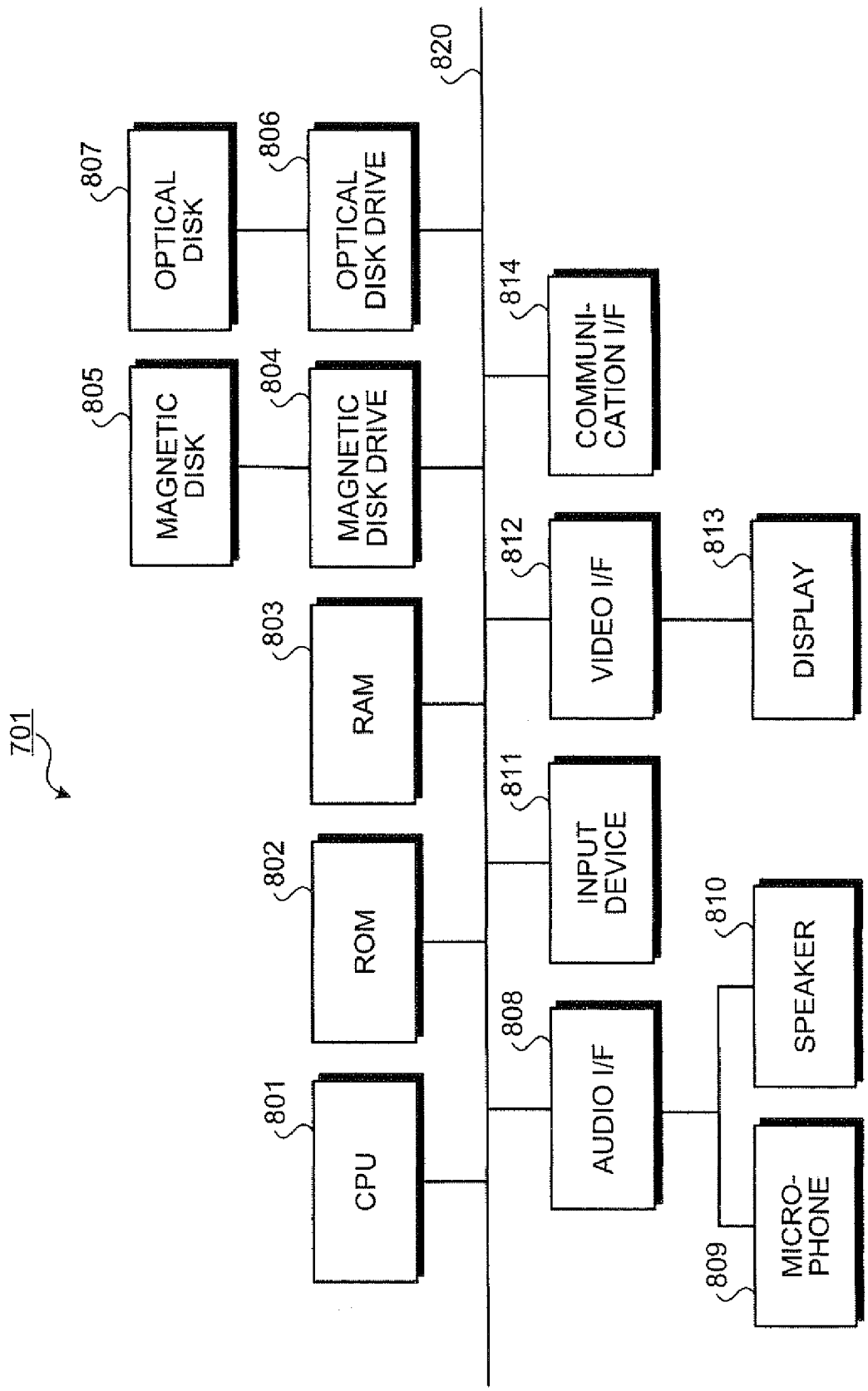
FIG. 8 is a block diagram of an exemplary hardware configuration of a subscription service server according to the example.

A hardware configuration of the subscription service server 701 according to the example will be described with reference to FIG. 8. FIG. 8 is a block diagram of an exemplary hardware configuration of the subscription service server according to this example.

As depicted in FIG. 8, the subscription service server 701 includes a CPU 801, a ROM 802, a RAM 803, a magnetic disk drive 804, a magnetic disk 805, an optical disk drive 806, an optical disk 807, an audio I/F (interface) 808, a microphone 809, a speaker 810, an input device 811, a video I/F 812, a display 813, and a communication I/F 814, respectively connected through a bus 820.

The CPU 801 governs overall control of the subscription service server 701. The ROM 802 stores therein various programs such as a boot program, a communication program, a data managing program, and a valid period setting program. The RAM 803 is used as a work area of the CPU 801.

The magnetic disk drive 804 controls the reading and the writing of data with respect to the magnetic disk 805 under the control of the CPU 801. The magnetic disk 805 stores therein the data written under the control of the magnetic disk drive 804. The magnetic disk 805 may be HD (hard disc) or FD (flexible disc), for example.

The optical disk drive 806 controls the reading and the writing of data with respect to the optical disk 807 under the control of the CPU 801. The optical disk 807 is a removable recording medium having data read out under the control of the optical disk drive 806. A writable recording medium may be utilized for the optical disk 807. The removable recording medium may be a medium other than the optical disk 807, such as an MO, a memory card, etc.

The audio I/F 808 is connected to the microphone 809 for audio input and the speaker 810 for audio output. Sound received by the microphone 809 is A/D-converted within the audio I/F 808. The speaker 810 outputs sound.

The input device 411 includes a remote controller having keys for entering characters, numeric values and various instructions, a keyboard, a mouse, a touch panel, etc.

The video I/F 812 is connected to the display 813. Specifically, the video I/F 812 is made up of, for example, a graphic controller that generally controls the display 813, a buffer memory such as VRAM (Video RAM) that temporarily records immediately displayable image information, and a control IC that controls the display 813 based on image data output from a graphic controller.

The display 813 displays icons, cursors, menus, windows, or various data such as characters and images. For example, a CRT, a TFT liquid crystal display, a plasma display, etc., may be employed as the display 813.

The communication I/F 814 is wirelessly connected to a network and functions as an interface between the subscription service server 701 and the CPU 801. The communication I/F 814 is wirelessly connected to a communication network such as the internet and functions as an interface between the CPU 801 and the communication network.

The communication network includes LANs, WANs, public line networks, portable telephone networks, etc. Specifically, the communication I/F 814 is made up of, for example, an FM tuner.

Figure 12:
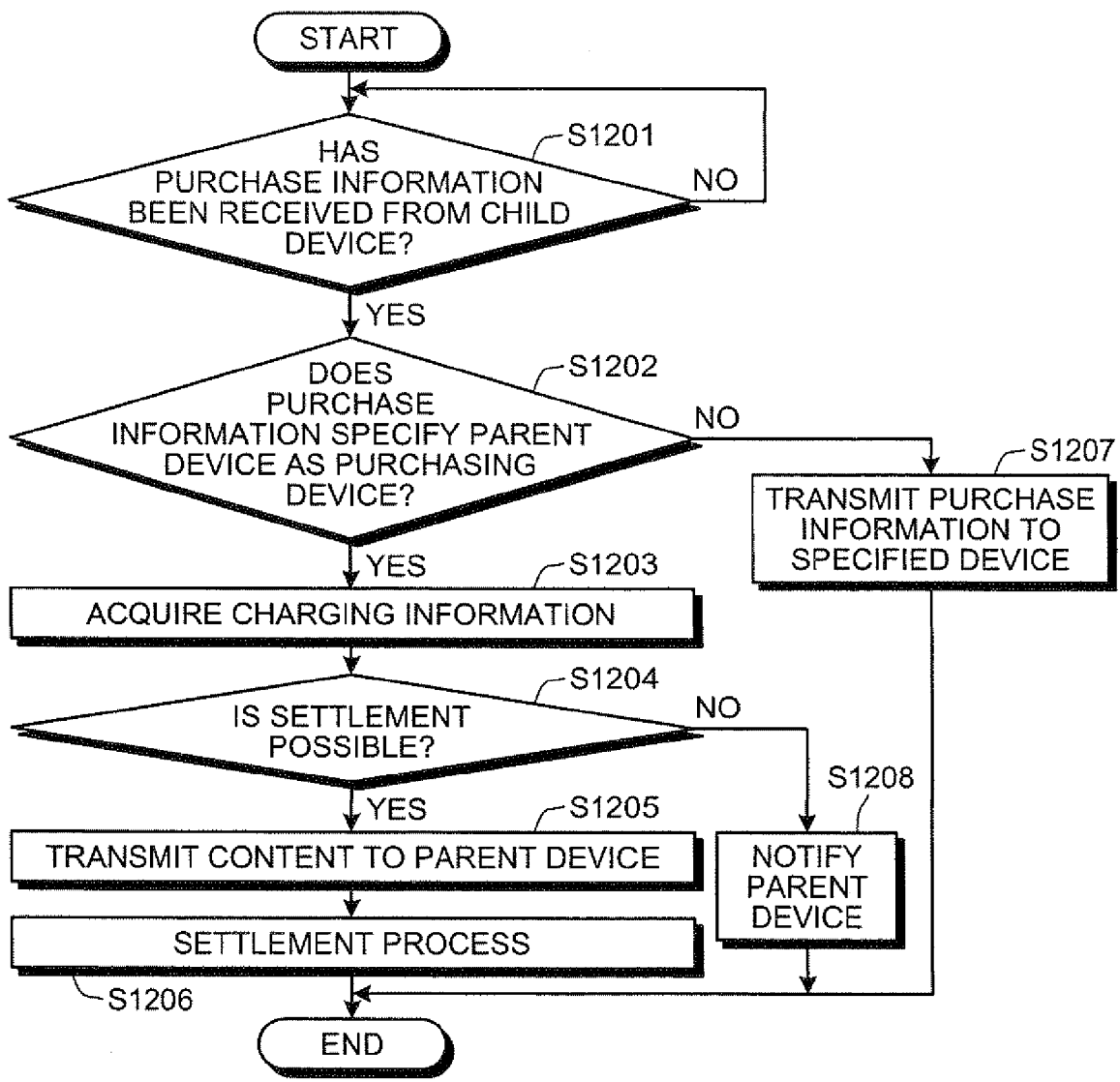
FIG. 12 is a flowchart of an exemplary distribution process of the subscription service server according to the example.

Although details are described with reference to FIG. 12, the subscription service server 701 is configured to communicate with the PC 702 and the navigation apparatus 703 depicted in FIGS. 9 and 10 to provide content.

Functions of the receiving unit 201, the identifying unit 202, and the distributing unit 203 included in the content distributing apparatus 200 depicted in FIG. 2 are implemented by the CPU 801 executing predetermined programs to control components of the subscription service server 701 with the use of programs and data recorded on the ROM 802, the RAM 803, the magnetic disk 805, the optical disk 807, etc., of the subscription service server 701 depicted in FIG. 8.

The subscription service server 701 of the example may execute a content distributing program recorded on the ROM 802 serving as a recording medium in the subscription service server 701 to implement the function of the content distributing apparatus 200 depicted in FIG. 2 in the content distribution process depicted in FIG. 5.

(Hardware Configuration of the PC 702)

A hardware configuration of the PC 702 according to the example will be described with reference to FIG. 9. FIG. 9 is a block diagram of an exemplary hardware configuration of the PC according to the example.

Figure 9:
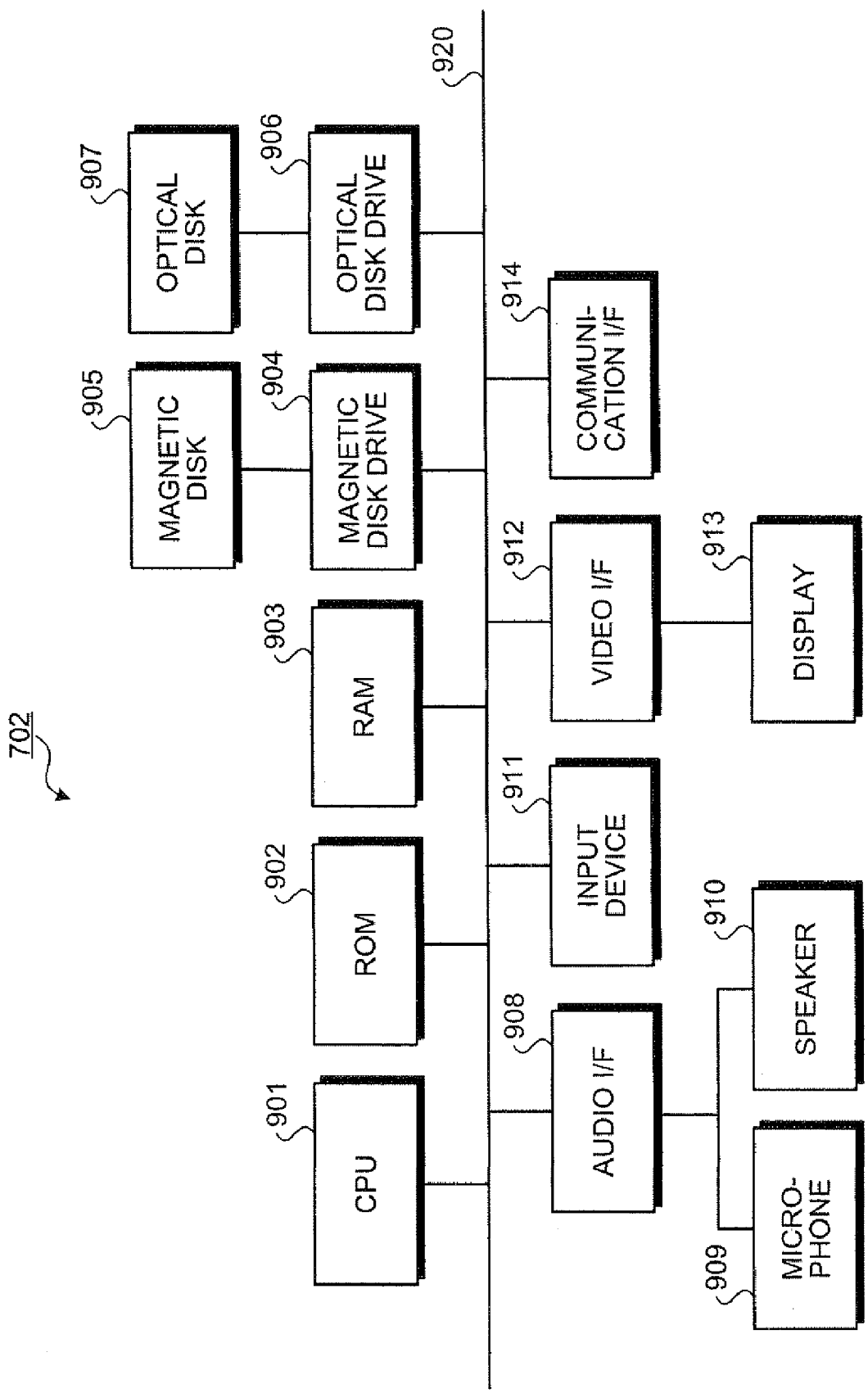
FIG. 9 is a block diagram of an exemplary hardware configuration of a PC according to the example.

As depicted in FIG. 9, the PC 702 includes a CPU 901, a ROM 902, a RAM 903, a magnetic disk drive 904, a magnetic disk 905, an optical disk drive 906, an optical disk 907, an audio I/F (interface) 908, a microphone 909, a speaker 910, an input device 911, a video I/F 912, a display 913, and a communication I/F 914, respectively connected through a bus 920.

The CPU 901 governs overall control of the PC 702. The ROM 902 stores therein various programs such as a boot program, a communication program, and a content managing program. The RAM 903 is used as a work area of the CPU 901.

Although details are described with reference to FIG. 13, the communication program and the content managing program cause communication with the subscription service server 701, the navigation apparatus 703, etc. as well as the purchase and recording/management of content (e.g., the content depicted in FIG. 7). Further, the programs cause the generation of copies of purchased content and the forwarding the copied content to the navigation apparatus 703, the reproducing terminal 704, etc.

The magnetic disk drive 904 controls the reading and the writing of data with respect to the magnetic disk 905 under the control of the CPU 901. The magnetic disk 905 stores therein the data written under the control of the magnetic disk drive 904. The magnetic disk 905 may be HD (hard disc) or FD (flexible disc), for example.

The optical disk drive 906 controls the reading and the writing of data with respect to the optical disk 907 under the control of the CPU 901. The optical disk 907 is a removable recording medium having data read out under the control of the optical disk drive 906. A writable recording medium may be utilized for the optical disk 907. The removable recording medium may be a medium other than the optical disk 907, such as an MO, a memory card, etc.

The audio I/F 908 is connected to the microphone 909 for audio input and the speaker 910 for audio output. Sound received by the microphone 909 is A/D-converted within the audio I/F 908. The speaker 910 outputs sound.

The input device 411 includes a remote controller having keys for entering characters, numeric values and various instructions, a keyboard, a mouse, a touch panel, etc.

The video I/F 912 is connected to the display 913. Specifically, the video I/F 912 is made up of, for example, a graphic controller that generally controls the display 913, a buffer memory such as VRAM (Video RAM) that temporarily records immediately displayable image information, and a control IC that controls the display 913 based on image data output from a graphic controller.

The display 913 displays icons, cursors, menus, windows, or various data such as characters and images. For example, a CRT, a TFT liquid crystal display, a plasma display, etc., may be employed as the display 913.

The communication I/F 914 is wirelessly connected to a network and functions as an interface between the PC 702 and the CPU 901. The communication I/F 914 is wirelessly connected to a communication network such as the internet and functions as an interface between the CPU 901 and the communication network.

The communication network includes LANs, WANs, public line networks, portable telephone networks, etc. Specifically, the communication I/F 914 is made up of, for example, an FM tuner.

Functions of the receiving unit 301, the recording unit 302, the copying unit 303, the selecting unit 304, and the transmitting unit 305 included in the content managing apparatus 300 depicted in FIG. 3 are implemented by the CPU 901 executing predetermined programs to control components of the PC 702 with the use of programs and data recorded on the ROM 902, the RAM 903, the magnetic disk 905, the optical disk 907, etc., of the PC 702 depicted in FIG. 9.

The PC 702 of the example may execute a content managing program recorded on the ROM 902 serving as a recording medium in the PC 702 to implement the function of the content managing apparatus 300 depicted in FIG. 3 in the content managing process depicted in FIG. 6.

(Hardware Configuration of the Navigation Apparatus 703)

A hardware configuration of the navigation apparatus 703 according to the example will be described with reference to FIG. 10. FIG. 10 is a block diagram of an exemplary hardware configuration of the navigation apparatus according to the example. Functions of the child device of the present invention will not be described in detail as the reproducing terminal 704 has equivalent functions.

Figure 10:
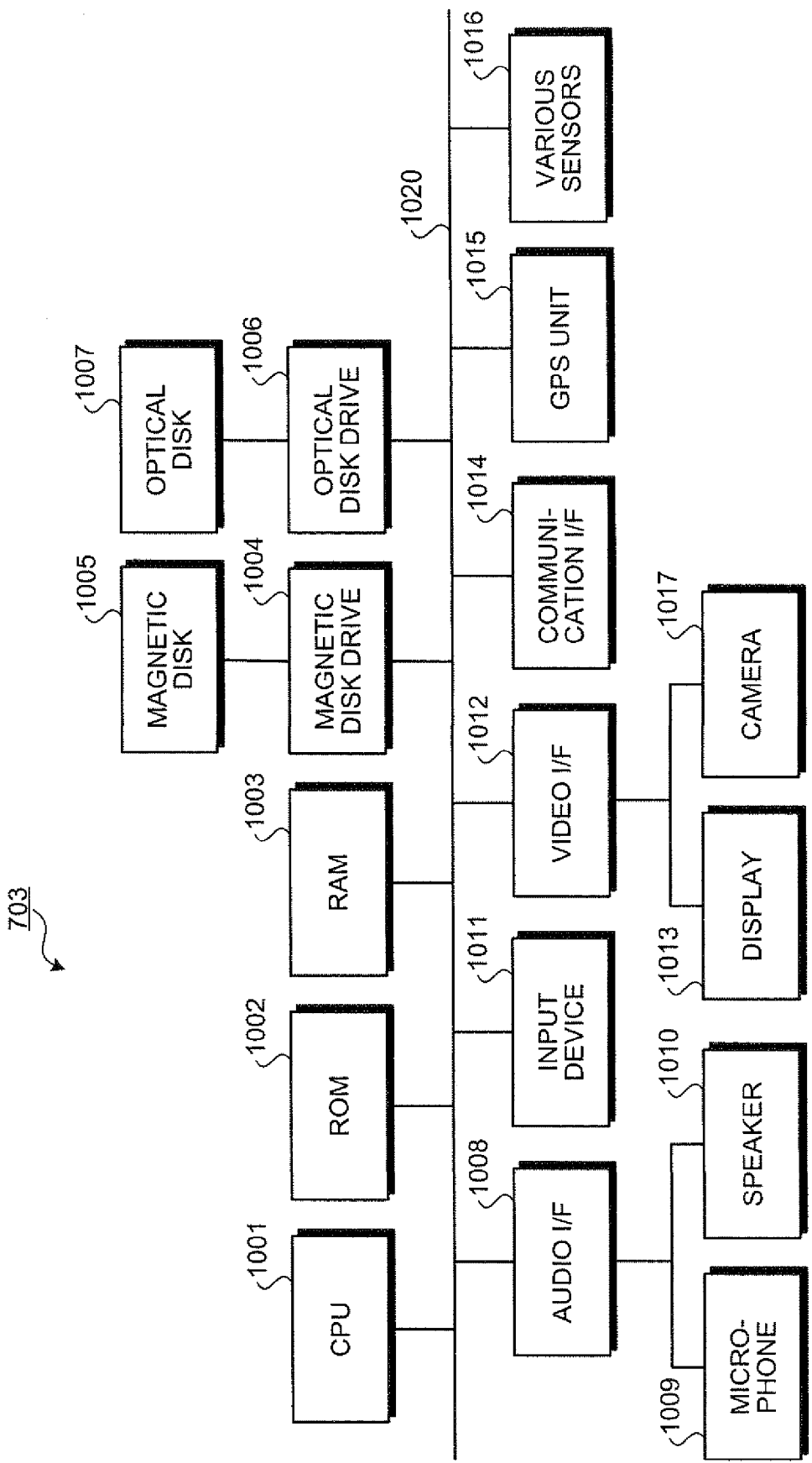
FIG. 10 is a block diagram of an exemplary hardware configuration of a navigation apparatus according to the example.

As depicted in FIG. 10, the navigation apparatus 703, equipped on a mobile object such as a vehicle, includes a CPU 1001, a ROM 1002, a RAM 1003, a magnetic disk drive 1004, a magnetic disk 1005, an optical disk drive 1006, an optical disk 1007, an audio I/F (interface) 1008, a microphone 1009, a speaker 1010, an input device 1011, a video I/F 1012, a display 1013, a communication I/F 1014, a GPS unit 1015, various sensors 1016, and a camera 1017, respectively connected through a bus 1020.

The CPU 1001 governs overall control of the navigation apparatus 703. The ROM 1002 stores therein various programs such as a boot program, a route search program, a route guidance program, a communication program, a content purchasing program, and a valid period setting program. The RAM 1003 is used as a work area of the CPU 1001.

Figure 11:
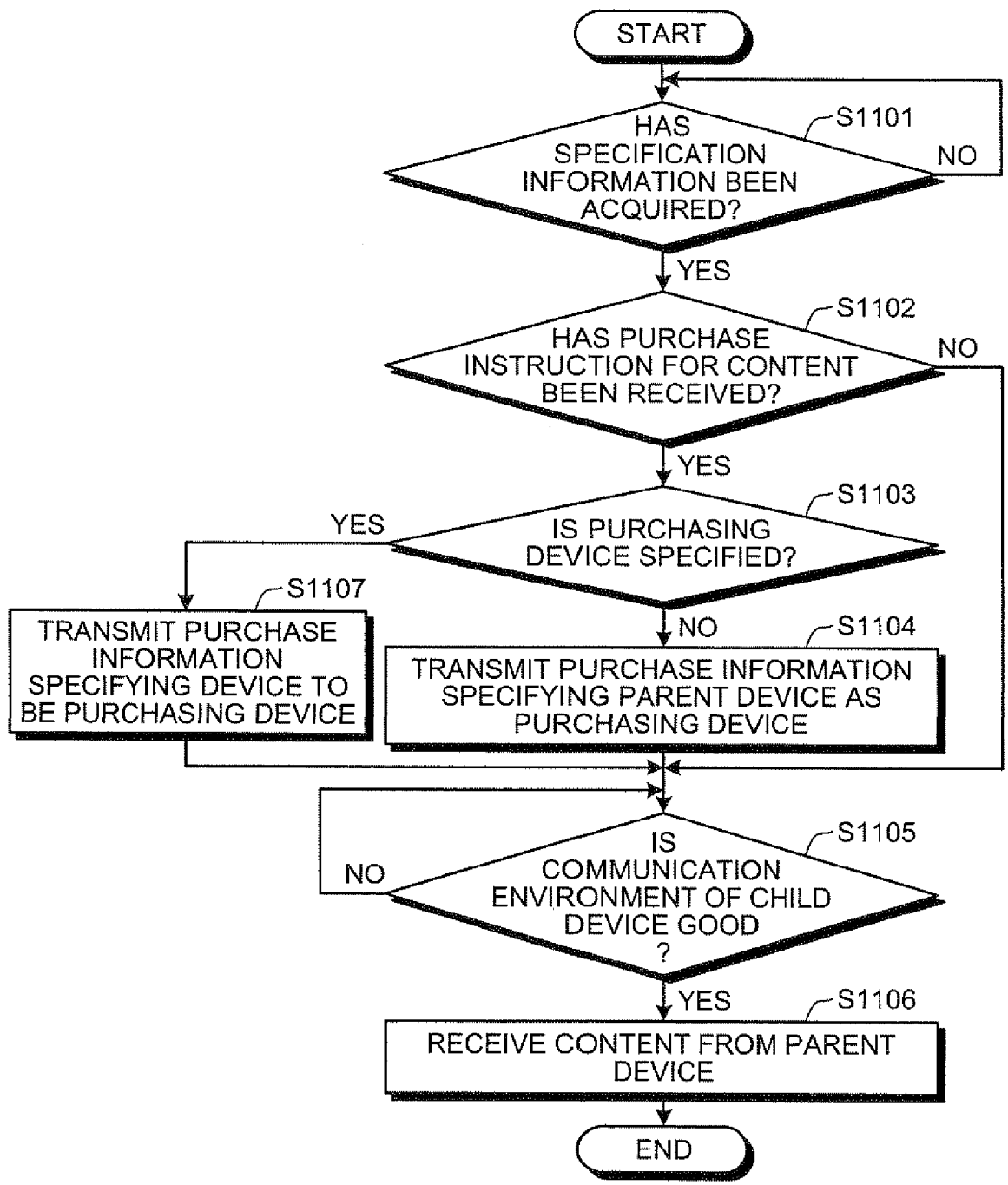
FIG. 11 is a flowchart of an exemplary purchase process of the navigation apparatus according to the example.

Although details are described with reference to FIG. 11, the content purchasing program and the communication program cause reproduction of the content provided from the subscription service server 701.

The route search program causes retrieval of an optimal route from a start point to a destination with the use of map information, etc., recorded on the magnetic disk 1005 and the optical disk 1007 described hereinafter. The optimal route is the shortest (or fastest) route to the destination or the most satisfying route for conditions specified by the user 750.

The route guidance program causes route guidance information to be generated in real time based on guide route information retrieved by executing the route search program, current position information calculated by executing a current position calculating program, and the map information read from the magnetic disk 1005 and the optical disk 1007 described hereinafter. The route guidance information generated by executing the route guidance program is output to the audio I/F 1008 or the video I/F 1012 via the CPU 1001.

The magnetic disk drive 1004 controls the reading and the writing of data with respect to the magnetic disk 1005 under the control of the CPU 1001. The magnetic disk 1005 stores therein the data written under the control of the magnetic disk drive 1004. The magnetic disk 1005 may be HD (hard disc) or FD (flexible disc), for example.

The optical disk drive 1006 controls the reading and the writing of data with respect to the optical disk 1007 under the control of the CPU 1001. The optical disk 1007 is a removable recording medium having data read out under the control of the optical disk drive 1006. A writable recording medium may be utilized for the optical disk 1007. The removable recording medium may be a medium other than the optical disk 1007, such as an MO, a memory card, etc.

The audio I/F 1008 is connected to the microphone 1009 for audio input and the speaker 1010 for audio output. Sound received by the microphone 1009 is A/D-converted within the audio I/F 1008. The speaker 1010 outputs sound.

The input device 411 includes a remote controller having keys for entering characters, numeric values and various instructions, a keyboard, a mouse, a touch panel, etc.

The video I/F 1012 is connected to the display 1013. Specifically, the video I/F 1012 is made up of, for example, a graphic controller that generally controls the display 1013, a buffer memory such as VRAM (Video RAM) that temporarily records immediately displayable image information, and a control IC that controls the display 1013 based on image data output from a graphic controller.

The display 1013 displays icons, cursors, menus, windows, or various data such as characters and images. For example, a CRT, a TFT liquid crystal display, a plasma display, etc., may be employed as the display 1013.

The communication I/F 1014 is wirelessly connected to a network and functions as an interface between the navigation apparatus 703 and the CPU 1001. The communication I/F 1014 is wirelessly connected to a communication network such as the internet and functions as an interface between the CPU 1001 and the communication network.

The communication network includes LANs, WANs, public line networks, portable telephone networks, etc. Specifically, the communication I/F 1014 is made up of, for example, an FM tuner, VICS (Vehicle Information and Communication System/beacon receiver, a radio navigation apparatus, and other navigation devices, and acquires road traffic information, such as traffic congestion and traffic regulations, distributed from VICS centers. VICS is a registered trademark. The communication I/F 1014 may be configured to acquire schedule information or profile information from a server not depicted.

The GPS unit 1015 receives signals from GPS satellites and outputs information indicative of the current position of the vehicle. The information output from the GPS unit 1015 is used when the CPU 1001 calculates the current position of the vehicle along with output values of the various sensors 1016 described hereinafter. The information indicative of the current position is information specifying a point with respect to the map information, for example, latitude/longitude and altitude.

The various sensors 1016 include a speed sensor, an acceleration sensor, and an angular-velocity sensor and output information that enables determination of position and behavior of the vehicle. The output values of the various sensors 1016 are used by the CPU 1001 for calculating the current position of the vehicle and measuring changes in velocity and direction.

The camera 1017 captures images of the interior and/or exterior of the vehicle. The images may be still images or moving images. The images captured by the camera 1017 are output through the video I/F 1012 to a recording medium such as the magnetic disk 1005 or the optical disk 1007.

Functions of the acquiring unit 101, the requesting unit 102, and the accepting unit 103 included in the content reproducing apparatus 100 depicted in FIG. 1 are implemented by the CPU 1001 executing predetermined programs to control the units of the navigation apparatus 703 with the use of programs and data recorded on the ROM 1002, the RAM 1003, the magnetic disk 1005, the optical disk 1007, etc., of the navigation apparatus 703 depicted in FIG. 10.

The navigation apparatus 703 of the example may execute the content purchasing program recorded on the ROM 1002 serving as a recording medium in the navigation apparatus 703 to implement the function of the content reproducing apparatus 100 depicted in FIG. 1 in the content purchasing process depicted in FIG. 4.

(Exemplary Process of Navigation Apparatus)

An exemplary process of requesting download of content from the navigation apparatus 703 to the subscription service server 701 according to the example will be described with reference to FIG. 11. FIG. 11 is a flowchart of an exemplary purchase process of the navigation apparatus according to the example. In the flowchart depicted in FIG. 11, the navigation apparatus 703 waits until the specification information is acquired (step S1101: NO) and if the navigation apparatus 703 acquires the specification information (step S1101: YES), it is determined whether a content purchase instruction has been received from the user 750 (step S1102).

Specifically, for example, the specification information is acquired when the user 750 manipulates operation buttons, etc., serving as the input device 1011 to specify the content the user wants to purchase. Specifically, for example, the purchase instruction is received when the user 750 manipulates the operation buttons, etc., serving as the input device 1011 to request purchase for the specified content.

If the content purchase instruction has been received at step S1102 (step S1102: YES), it is determined whether a purchasing device is specified (step S1103). If a purchasing device is not specified at step S1103, for example, if the purchase is made under the management of the parent device (step S1103: NO), the communication I/F 1014 transmits the purchase information defining the parent device as the purchasing device to the subscription service server 701 (step S1104). The purchase information includes specification information concerning the content, specified device information that specifies the purchasing device, and identification information such as an ID that identifies the child device.

It is determined whether the communication environment of the child device is good (step S1105). Whether the communication environment of the child device is good is determined by, for example, determining whether the environment is a communication environment that enables download in the event of wireless communication or determining whether the parent device is directly connected in the event of a wired connection. Waiting occurs for the communication environment of the child device to become good (step S1105: NO), when the communication environment of the child device is good (step S1105: YES), the content is received from the parent device (step S1106), ending the process.

On the other hand, if the purchasing device is specified at step S1103 (step S1103 YES), the purchase information specifying a device as the purchasing device is transmitted to the subscription service server 701 (step S1107) and the process proceeds to step S1105 and continues. Specifically, for example, the navigation apparatus 703 may be specified. If the content purchase instruction is not received at step S1102 (step S1102: NO), the process proceeds to step S1105 and continues.

In the example, the purchase information transmitted from the child device to the subscription service server 701 may include information to the parent device to indicate whether copies are to be transmitted to the child device or to indicate that only the purchase right may be transmitted to the child device. The information may further indicate the number of copies to be generated simultaneously, the transmission destination of the copies, etc. and such information may be set preliminarily in the subscription service server 701 or the parent device.

As described, according to the navigation apparatus 703 of the example, the acquiring unit 101 acquires information concerning the purchase target content and the requesting unit 102 makes a purchase request for the purchase target content to receive the purchase target content from the content managing apparatus 300 that manages the navigation apparatus 703. Therefore, a purchase request may be made even if a communication path is narrow between the navigation apparatus 703 and the requesting apparatus. Thus, the user 750 can make a content purchase request any time the user wants to purchase the content regardless of the communication environment.

According to the navigation apparatus 703 of the example, selection between the purchase target content being purchased under the management of the content managing apparatus 300 and the purchase target content being purchased through an apparatus other than the content managing apparatus 300 can be made. Therefore, for example, if the purchase target content cannot be purchased under the management of the content managing apparatus 300 for some reason, the purchase target content can be purchased using another apparatus selected as the purchasing device. Thus, the user 750 can make a content purchase request any time the user wants to purchase the content.

According to the navigation apparatus 703 of the example, the purchase target content may be purchased with the navigation apparatus 703 defined as the purchasing device. Thus, the user 750 can download the purchase target content with the navigation apparatus 703 if the purchase cannot be made under the management of the content managing apparatus 300 for some reason or if the communication environment of the navigation apparatus 703 is stable.

As described, according to the content reproducing apparatus, the content purchasing method, the content purchasing program, and the recording medium of the present invention, the navigation apparatus 703 sends the purchase information to the subscription service server 701 and receives content from the PC 702. Therefore, a purchase request can be made even if a communication path is narrow between the navigation apparatus 703 and the subscription service server 701. Thus, the user 750 can make a content purchase request any time the user 750 wants to purchase the content regardless of the communication environment. The same applies to the reproducing terminal 704.

According to the navigation apparatus 703 of the example, selection between the purchase target content being purchased under the management of the PC 702 and the purchase target content being purchased through an apparatus other than the PC 702 can be made. Therefore, for example, if the purchase target content cannot be purchased under the management of the PC 702 for some reason, the purchase target content can be purchased using another apparatus selected as the purchasing device. Thus, the user 750 can make a content purchase request any time the user wants to purchase the content.

According to the navigation apparatus 703 of the example, the purchase target content can be purchased with the navigation apparatus 703 defined as the purchasing device. Thus, the user 750 can download the purchase target content with the navigation apparatus 703 if the purchase cannot be made under the management of the PC 702 for some reason or if the communication environment of the navigation apparatus 703 is stable.

(Exemplary Process of Subscription Service Server)

An exemplary process of the subscription service server 701 according to the example will be described with reference to FIG. 12. FIG. 12 is a flowchart of an exemplary distribution process of the subscription service server according to the example. In the flowchart depicted in FIG. 12, the subscription service server 701 waits until it is determined that purchase information has been received from the child device through the communication I/F 814 (step S1201: NO) and if it is determined that purchase information has been received (step S1201: YES), it is determined whether the purchase information specifies the parent device as the purchasing device (step S1202). If it is determined that the purchase information defines the parent device as the purchasing device (step S1202: YES), the charging information concerning the user 750 is acquired by the function of the charging server, for example (step S1203).

It is determined whether settlement is possible based on the acquired charging information (step S1204). Specifically, for example, whether settlement is possible is determined by determining whether the user 750 can make remittance based on the contract information and the charging information for the user 750. If it is determined that settlement is possible at step S1204 (step S1204: YES), the content is transmitted to the parent device (step S1205). A settlement process is subsequently executed, such as confirming remittance from the parent device (step S1206), ending the process.

On the other hand, if it is determined that the purchase information does not define the parent device as the purchasing device at step S1202 (step S1202: NO), i.e., if the purchase information specifies a device (e.g., the navigation apparatus 703) as the purchasing device, the content is transmitted to the device specified as the purchasing device (step S1207), ending the process. If it is determined at step S1204 that settlement is impossible, for example, because of insufficient funds in a designated account of the user 750 (step S1204: NO), the parent device is notified accordingly (step S1208), ending the process.

If a right making the time limit of time-limited content indefinite (purchase right) is purchased in the above exemplary process of the subscription service server, the history of download to the parent device is acquired after step S1204 to determine whether content exists in the parent device. If time-limited content exists in the parent device, the content may be specified to transmit the purchase right of the content to the parent device. When determining whether time-limited content exists in the parent device, the presence of overlap may be checked by reference to purchased content and purchase history of the right, and if overlap exists, the child device and the parent device may be notified of the overlap before purchase. The presence of time-limited content may be confirmed by making a direct inquiry to the parent device.

As described, the subscription service server 701 of the example receives the purchase request for the purchase target content from an apparatus communicable with the subscription service server 701 and distributes the purchase target content to the content managing apparatus 300. Since this enables all the purchase target content to be distributed to the content managing apparatus 300 based on the purchase requests from the communicable apparatus, the purchase target content may be distributed based only on a content purchase contract with the content managing apparatus 300.

According to the subscription service server 701 of the example, the order in which apparatuses among the apparatuses communicable with the subscription service server 701 are applicable as the content managing apparatus 300 may be set in advance and the communication environments of the apparatuses may be determined to select the content managing apparatus 300 based on the order and the determined communication environments. Therefore, since the content managing apparatus 300, which has the best communication environment, may properly be selected, the subscription service server 701 may stably distribute the purchase target content to the selected content managing apparatus 300.

As described, according to the content distributing apparatus, the content distributing method, the content distributing program, and the recording medium of the present invention, the subscription service server 701 of the example receives the content purchase requests from the navigation apparatus 703 and distributes content to the PC 702 serving as the parent device. Since this enables all the purchase target content to be distributed to the parent device based on the purchase requests from the child device, the purchase target content may be distributed based only on a content purchase contract with the parent device.

According to the subscription service server 701 of the example, the order in which the child devices are applicable as the parent device may be set in advance and the communication environments of the child devices may be determined to select the parent device based on the order and the determined communication environments. Therefore, since the parent device, which has the best communication environment, may properly be selected, the subscription service server 701 may stably distribute the purchase target content to the selected parent device.

(Exemplary Process of PC)

An exemplary process of the PC 702 according to the example will be described with reference to FIG. 13. FIG. 13 is a flowchart of an exemplary management process of the PC 702 according to the example. In the flowchart depicted in FIG. 13, the PC 702 waits until it is determined that the content has been from the subscription service server 701 through the communication I/F 814 (step S1301: NO), and if it is determined that the content has been received (step S1301: YES), the received content is recorded on a recording medium such as the magnetic disk 905 and the optical disk 907 by a drive such as the magnetic disk drive 904 and the optical disk drive 906 (step S1302).

Settlement is then confirmed based on the charging information added to the content (step S1303). Specifically, for example, it is confirmed that the cost of the content has been paid. The CPU 901 controls the magnetic disk drive 904 and the optical disk drive 906 to generate copies of the content recorded at step S1302 (step S1304). The copied content is automatically transmitted through the communication I/F 914 to the child device (step S1305), ending the process.

As described, the PC 702 of the example can copy and transmit the purchase target content distributed from the content distributing apparatus 200 to the apparatus managed by the PC 702. Therefore, the PC 702 may unify the management of the purchase target content requested for purchase from the managed apparatuses. Thus, the user 750 can easily comprehend what is downloaded, at what time, and with which managed apparatus by simply accessing the PC 702.

The PC 702 of the example records the purchase target content distributed from the content distributing apparatus 200 into the recording unit 302. Therefore, at the time of the transmission, the copies of the purchase target content can be transmitted easily to the managed apparatuses, for example, without connection to a network.

As described, according to the content managing apparatus, the content managing method, the content managing program, and the recording medium of the present invention, the PC 702 of the example can copy and transmit the purchase target content distributed from the subscription service server 701 to the apparatuses managed by the PC 702. Therefore, the PC 702 can unify the management of the purchase target content requested for purchase from the child devices. Thus, the user 750 can easily comprehend what is downloaded, at what time, and with which child device by simply accessing the parent device.

The parent device records the purchase target content distributed from the subscription service server 701. Therefore, at the time of the transmission, the copies of the purchase target content can be transmitted easily to the child device, for example, without connecting to a network.

Although the parent device is registered in the subscription service server 701 and the child device makes a purchase request for content to the subscription service server 701 to trigger the distribution of the requested content, etc., to the registered parent device in the example, a purchase request from the child device may be made through the parent device to the subscription service server 701 alternatively. Specifically, for example, an arbitrary device among devices linked and communicable with each other through a network is registered as a parent device, and the devices not registered are shared as child devices. If a user wants to purchase a music track while listening to content such as music using the child device, the use manipulates the operation buttons, etc., of the child device to give a content purchase instruction; thereby a content purchase instruction is transmitted to the registered parent device along with information concerning the content.

The parent device receives the content purchase instruction, transmits a purchase request to the subscription service server 701, and then acquires the content from the subscription service server 701. The parent device generates copies of the acquired content and automatically transmits the copied content to the child device making the purchase instruction. Such a purchase format achieves the same effects as the example. The setting and registration of a parent device and child devices may be performed by a device to be specified as the parent device to set and register other devices as child devices through the network or the parent device may be specified through the network from a device that is not to be defined as the parent device to set and register the parent device and the child devices. Even if a device has a function of directly making a purchase request to the subscription service server, a purchase request from the parent device may be prioritized and, for example, the device may refer to whether the parent device is set and registered, and may directly make a purchase request with the use of the function of the device in such a case that the parent device is not set.

The content purchase instruction from the child device to the parent device may be given by the child device acquiring information concerning content from the network through user manipulation of the operation buttons, etc., as above and transmitting the content purchase instruction to the set and registered parent device along with the acquired information concerning the content. Thus, information necessary for the purchase of the content can be acquired and the content purchase instruction can be given to the parent device by a simple operation. The registration of the parent device in the subscription service server 710 is not necessary in such a purchase format, and a purchase format may be established such that, among devices belonging to the user 750 or, for example, friends and acquaintances for the sharing of information, the parent device and the child devices are set and registered.

The content purchase requesting method, the content purchasing method, the content distributing method, the content managing method, the content purchasing and distributing method described in the embodiment may be implemented by executing a preliminarily prepared program with a computer such as a personal computer and a workstation. The program is recorded on a computer-readable recording medium such as a hard disk, a flexible disk, a CD-ROM, an MO, and a DVD and is read from the recording medium by the computer for execution. The program may be a transmission medium distributable through a network such as the Internet.

The invention claimed is:

1. A content distributing system including a content distributing apparatus that distributes video or audio content and further including a plurality of content recording apparatuses that are communicable with the content distributing apparatus and record content distributed from the content distributing apparatus, wherein the content recording apparatuses respectively comprise a request transmitting unit that transmits to the content distributing apparatus, a content purchase request including specification information specifying content and identification information uniquely identifying the content recording apparatuses respectively, a content receiving unit that receives from the content distributing apparatus, the content corresponding to the purchase request transmitted, and a recording unit that records the content received by the content receiving unit; and the content distributing apparatus comprises a request receiving unit that receives a content purchase request from one of the content recording apparatuses, a determining unit that determines communication environment quality for the content recording apparatuses, respectively, a selecting unit that based on communication environment qualities determined by the determining unit, selects from among the content recording apparatuses, a content recording apparatus as a destination to which the content corresponding to the purchase request is to be transmitted, a confirming unit that confirms remittance for the content by a user of the content recording apparatus selected by the selecting unit, and a content transmitting unit that, in response to confirmation of remittance, transmits the content to the content recording apparatus selected.

2. The content distributing system according to claim 1, wherein the content distributing apparatus further comprises an identifying unit that identifies content based on the specification information received by the request receiving unit, the confirming unit confirms remittance for the content identified by the identifying unit, and the content transmitting unit, in response to confirmation of remittance, transmits the content identified by the identifying unit to the content recording apparatus selected by the selecting unit.

3. The content distributing system according to claim 1, wherein the content distributing apparatus further comprises a setting unit that preliminarily sets an order in which the content recording apparatuses are applicable as the destination of the content, the selecting unit, based on the order set by the setting unit and the communication environment qualities determined by the determining unit, selects the content recording apparatus to which the content is to be transmitted.

4. A content distribution method for a content distributing system including a content distributing apparatus that distributes video or audio content and further including a plurality of content recording apparatuses that are communicable with the content distributing apparatus and record content distributed from the content distributing apparatus, the content distribution method comprising:

transmitting to the content distributing apparatus, a content purchase request including specification information specifying content and identification information uniquely identifying the content recording apparatuses respectively;

receiving from the content distributing apparatus, the content corresponding to the purchase request transmitted;

recording the content received at the receiving the content;

receiving a content purchase request from one of the content recording apparatuses;

determining communication environment quality for the content recording apparatuses, respectively;

selecting based on communication environment qualities determined at the determining and from among the content recording apparatuses, a content recording apparatus as a destination to which the content corresponding to the purchase request is to be transmitted;

confirming remittance for the content by a user of the content recording apparatus selected at the selecting; and transmitting, upon confirmation of remittance, the content to the content recording apparatus selected.

5. A computer-readable recording medium storing therein a computer program that with respect to a content distributing system including a content distributing apparatus that distributes video or audio content and further including a plurality of content recording apparatuses that are communicable with the content distributing apparatus and record content distributed from the content distributing apparatus, causes a computer to execute:

transmitting to the content distributing apparatus, a content purchase request including specification information specifying content and identification information uniquely identifying the content recording apparatuses respectively;

receiving from the content distributing apparatus, the content corresponding to the purchase request transmitted;

recording the content received, at the receiving the content;

receiving a content purchase request from one of the content recording apparatuses;

determining communication environment quality for the content recording apparatuses, respectively;

selecting based on communication environment qualities determined at the determining and from among the content recording apparatuses, a content recording apparatus as a destination to which the content corresponding to the purchase request is to be transmitted;

confirming remittance for the content by a user of the content recording apparatus selected at the selecting; and transmitting, upon confirmation of remittance, the content to the content recording apparatus selected.

* * * * *